(12) United States Patent
Hongo et al.

(10) Patent No.: US 12,199,483 B2
(45) Date of Patent: Jan. 14, 2025

(54) COIL UNIT, STATOR MEMBER, STATOR, MOTOR, AND MANUFACTURING METHOD FOR COIL UNIT, STATOR MEMBER, STATOR, AND MOTOR

(71) Applicant: ASTER CO., LTD., Yokote (JP)

(72) Inventors: Takenobu Hongo, Fukushima (JP); Yuta Furuya, Yokote (JP)

(73) Assignee: ASTER CO., LTD., Yokote (JP)

( * ) Notice: Subject to any disclaimer, the term of this patent is extended or adjusted under 35 U.S.C. 154(b) by 886 days.

(21) Appl. No.: 16/967,369

(22) PCT Filed: Jan. 25, 2019

(86) PCT No.: PCT/JP2019/002458
§ 371 (c)(1),
(2) Date: Aug. 4, 2020

(87) PCT Pub. No.: WO2019/155912
PCT Pub. Date: Aug. 15, 2019

(65) Prior Publication Data
US 2021/0036566 A1    Feb. 4, 2021

(30) Foreign Application Priority Data

Feb. 8, 2018  (JP) ................................ 2018-020717

(51) Int. Cl.
*H02K 3/04*         (2006.01)
*B23K 20/02*        (2006.01)
*H02K 15/04*        (2006.01)

(52) U.S. Cl.
CPC ............... *H02K 3/04* (2013.01); *B23K 20/02* (2013.01); *H02K 15/0435* (2013.01)

(58) Field of Classification Search
None
See application file for complete search history.

(56) References Cited

U.S. PATENT DOCUMENTS

| 8,575,798 B2 | 11/2013 | Takahashi et al. |
| 10,211,710 B2 | 2/2019 | Hongo |
| 10,355,548 B2 | 7/2019 | Hirabayashi |
| 10,389,215 B2 | 8/2019 | Yabe et al. |

(Continued)

FOREIGN PATENT DOCUMENTS

| CN | 101405928 A | 4/2009 |
| DE | 69632230 T2 | 4/2005 |

(Continued)

OTHER PUBLICATIONS

Search Report dated Sep. 15, 2021, directed to EP Application No. 19750268.5; 4 pages.

(Continued)

*Primary Examiner* — Bernard Rojas
(74) *Attorney, Agent, or Firm* — Morrison & Foerster LLP

(57) ABSTRACT

There are provided a coil unit, a stator member, a motor, and methods of manufacturing these, configured to achieve downsizing and simplified manufacturing steps. The coil unit includes a coil, and a bus bar including a connection end portion to which the coil is connected. One end of the coil and the connection end portion are welded by cold pressure welding with end faces of them being butted in a welded portion.

18 Claims, 14 Drawing Sheets

(56) References Cited

U.S. PATENT DOCUMENTS

| | | | |
|---|---|---|---|
| 10,742,097 | B2 | 8/2020 | Hongo |
| 2005/0029892 | A1 | 2/2005 | Ariyoshi et al. |
| 2009/0096313 | A1 | 4/2009 | Harada et al. |
| 2015/0188376 | A1 | 7/2015 | Yamaguchi et al. |
| 2016/0315525 | A1* | 10/2016 | Hongo ............... H02K 15/0068 |
| 2016/0344269 | A1 | 11/2016 | Yabe et al. |
| 2016/0380500 | A1 | 12/2016 | Oka et al. |
| 2018/0041087 | A1 | 2/2018 | Hayashizaka et al. |
| 2019/0006921 | A1 | 1/2019 | Hongo |
| 2019/0348886 | A1* | 11/2019 | Hishida ................. H02K 21/16 |
| 2020/0287446 | A1 | 9/2020 | Hongo |
| 2022/0131449 | A1* | 4/2022 | Hongo ................... H02K 3/522 |
| 2022/0337135 | A1 | 10/2022 | Hongo |
| 2022/0352792 | A1 | 11/2022 | Hongo |

FOREIGN PATENT DOCUMENTS

| | | |
|---|---|---|
| DE | 102014224393 A1 | 6/2016 |
| EP | 3258574 A1 | 12/2017 |
| JP | 53-5720 A | 1/1978 |
| JP | S62-40041 A | 2/1987 |
| JP | 06-233483 A | 8/1994 |
| JP | H10-146000 A | 5/1998 |
| JP | 2005-6373 A | 1/2005 |
| JP | 2009-89456 A | 4/2009 |
| JP | 2009-106008 A | 5/2009 |
| JP | 2010-11627 A | 1/2010 |
| JP | 2010-124636 A | 6/2010 |
| JP | 2014-36478 A | 2/2014 |
| JP | 5592554 B1 | 9/2014 |
| JP | 2014-217105 A | 11/2014 |
| JP | 2015-135955 A | 7/2015 |
| JP | 2017-55600 A | 3/2017 |
| WO | 2015/111214 A1 | 7/2015 |
| WO | 2015/151202 A1 | 10/2015 |
| WO | WO-2017154466 A1 * | 9/2017 ............... H02K 3/18 |

OTHER PUBLICATIONS

International Search Report and Written Opinion dated Apr. 16, 2019, directed to International Application No. PCT/ P2019/ 002458; 12 pages.

Notice of Reasons for Refusal dated Jul. 4, 2023, directed to JP Application No. 2022-030791; 7 pages.

The Second Office Action dated Sep. 28, 2023, directed to CN Application No. 201980012263.5; 18 pages.

First Office Action dated Mar. 6, 2023, directed to CN Application No. 201980012263.5; 12 pages.

Office Action dated Apr. 18, 2024, directed to EP Application No. 19750268.5; 10 pages.

Notice of Reasons for Refusal dated Jan. 17, 2023, directed to JP Application No. 2022-0307331; 6 pages.

Notice of Reason for Refusal dated Dec. 3, 2024, directed to Japanese Application No. 2023-217724; 6 pages.

* cited by examiner

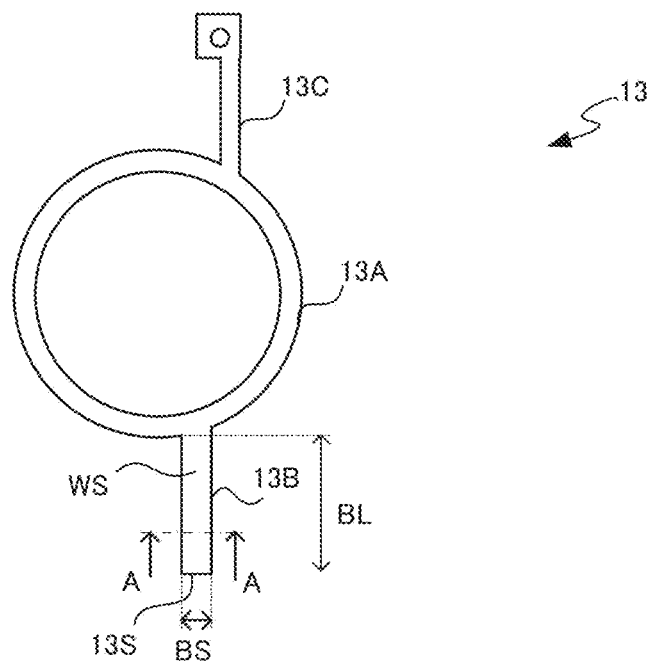
Fig. 2A
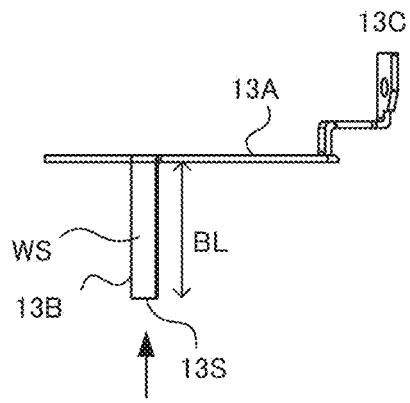
Fig. 2B
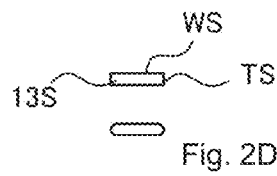
Fig. 2C
Fig. 2D

Fig. 3A
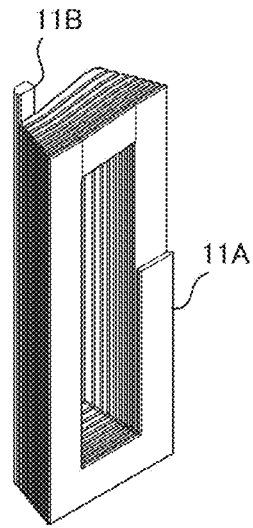
Fig. 3B
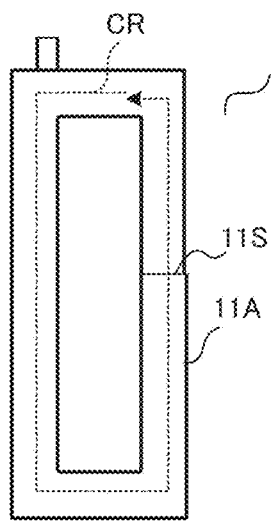
Fig. 3C
Fig. 3D
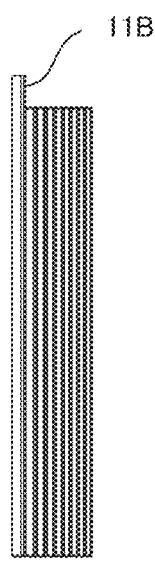
Fig. 3E
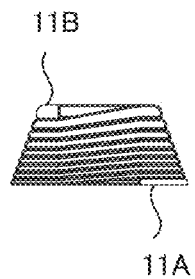
Fig. 3F
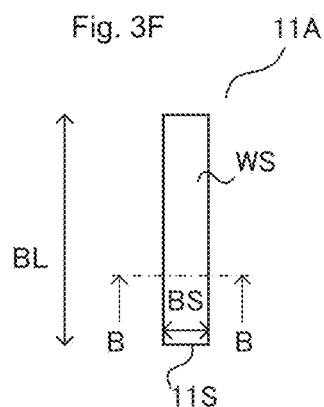
Fig. 3G
Fig. 3H
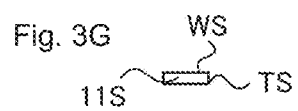

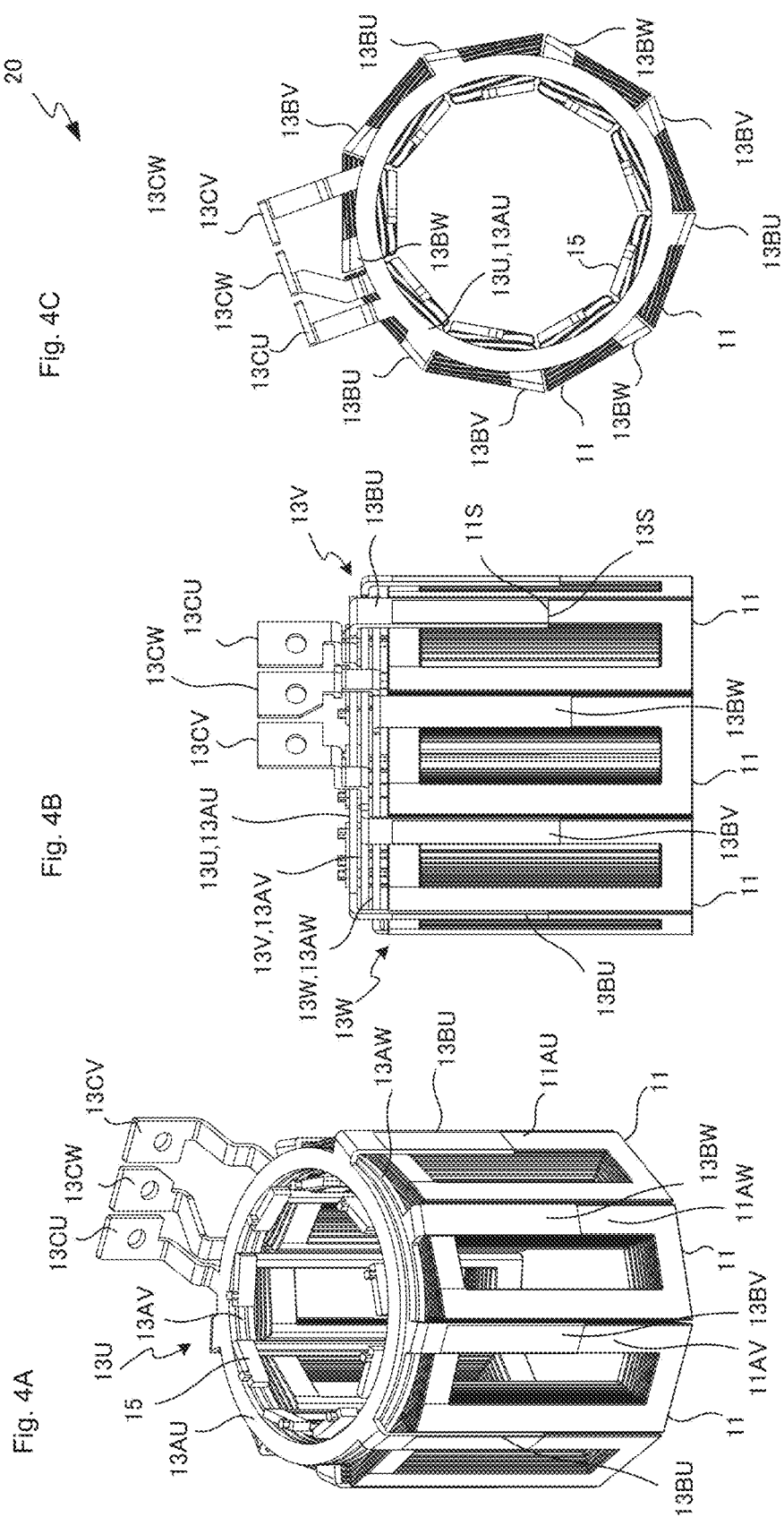

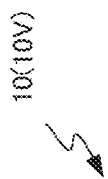
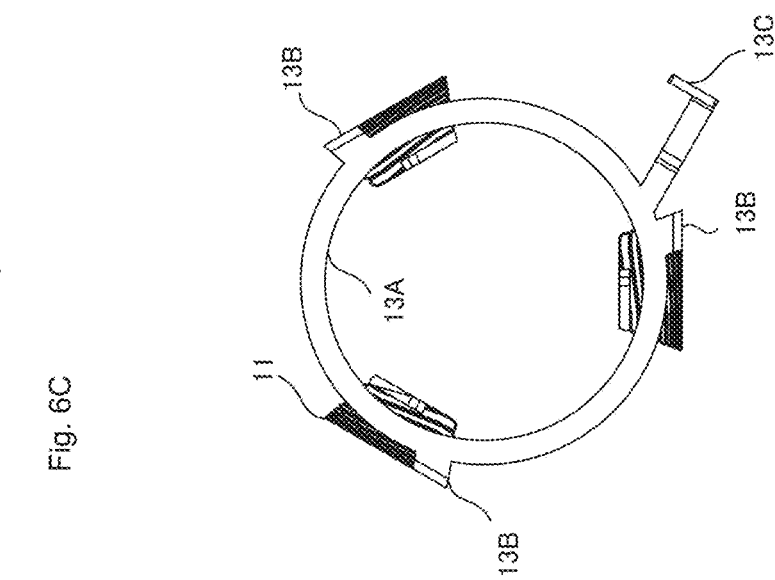
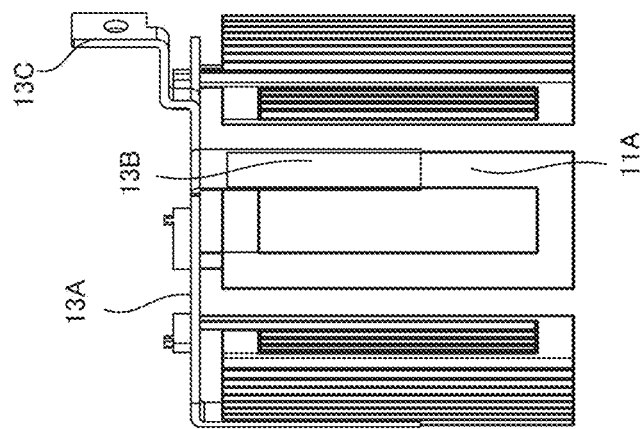
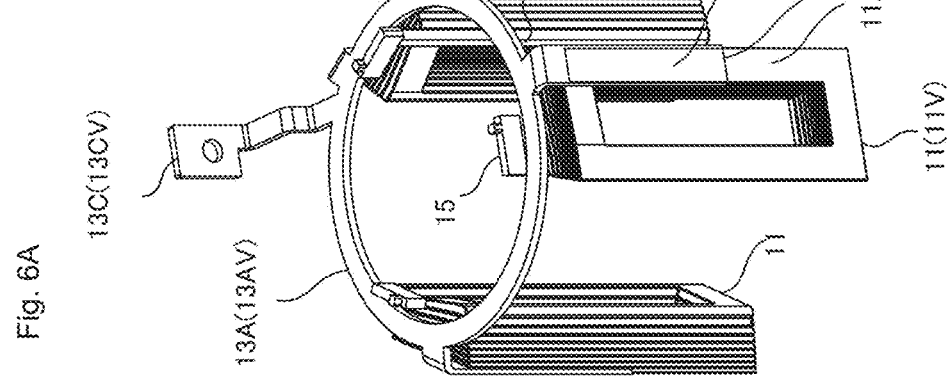
Fig. 6A  Fig. 6B  Fig. 6C

COIL UNIT, STATOR MEMBER, STATOR, MOTOR, AND MANUFACTURING METHOD FOR COIL UNIT, STATOR MEMBER, STATOR, AND MOTOR

CROSS-REFERENCE TO RELATED APPLICATIONS

This application is a U.S. national phase patent application of International Patent Application No. PCT/JP2019/002458, filed Jan. 25, 2019, which claims priority to Japanese Patent Application No. 2018-020717, filed Feb. 8, 2018, the entire contents of each of which are incorporated herein by reference.

FIELD OF THE DISCLOSURE

The present invention relates to a coil unit, a stator member, a stator, a motor, and methods of manufacturing these.

BACKGROUND OF THE DISCLOSURE

Edgewise coils configured by stacking steel sheets manufactured by press punching have conventionally been known. For example, the edgewise coils are adopted in stators of motors, and the like.

The stators in this case are formed by sequentially attaching molded coils (edgewise coils) to a plurality of slots (teeth) provided on an inner peripheral surface of an annular stator core, and connecting one end of each of the annularly disposed coils to a bus bar.

More specifically, the annularly disposed coils each have the one end (end edge portion) projecting upward in an axis direction of the stator core. These ends are each connected to a rod-like (semi-circular) or annular bus bar, which extends in a circumferential direction of the stator core, by welding or the like. For example, in the case of a three-phase motor, the coils are attached to the slots so that a U-phase coil, a V-phase coil, and a W-phase coil adjoin each other in turn along the circumferential direction of the stator core. The bus bar is connected with each one end of the coils, which appear at intervals of two coils in the circumferential direction, for every U, V and W phase (see, for example, Patent Literature 1).

PATENT LITERATURE

Patent Literature 1: Japanese Patent Application Laid-Open No. 2009-89456

SUMMARY OF THE DISCLOSURE

However, in the conventional connection method, the coils are annularly disposed, and then each end of the coils projecting upward is connected to a circular bus bar. Accordingly, the connection method is limited to welding, screwing, or the like, and this causes a welded portion to have a complicated configuration. As a result, there is a limit on downsizing of the completed stators. Moreover, there is also a problem of upsizing of an apparatus used for connection, which complicates operations for connection.

In view of these actual circumstances, an object of the present invention is to provide a coil unit, a stator member, a stator, a motor, and methods of manufacturing these, configured to achieve downsizing and simplified manufacturing steps.

An aspect of the present invention provides a coil unit including: a coil; and a bus bar including a connection end portion to which the coil is connected. One end of the coil and the connection end portion are welded by cold pressure welding with end faces of them being butted in a welded portion. The welded portion is provided on the way to a turn of a helical structure of the coil.

An aspect of the present invention also provides a stator member including a plurality of the aforementioned coil units. The plurality of coil units includes a first coil unit and a second coil unit. The first coil unit and the second coil unit are assembled so that one coil of the first coil unit is different in phase of current or voltage from one coil of the second coil unit.

An aspect of the present invention also provides a motor including the foregoing stator member.

An aspect of the present invention also provides a method of manufacturing a coil unit, including: a step of preparing a coil and a substantially annular bus bar including a connection end portion to which the coil is connected; a step of disposing the coil and the bus bar so that a center axis direction (hereinafter referred to as "first center axis direction") of a helical structure body of the coil aligns with a center axis direction (hereinafter referred to as "second center axis direction") of the bus bar, butting an end face of one end of the coil and an end face of the connection end portion, and welding the end faces by cold pressure welding on the way to a turn of the helical structure body; and a step of bending the coil with respect to the bus bar so that the first center axis direction intersects the second center axis direction.

An aspect of the present invention also provides a method of manufacturing a stator member, including: a step of forming a first coil unit and a second coil unit by the aforementioned method; and a step of assembling the first coil unit and the second coil unit so that one coil of the first coil unit is different in phase of current or voltage from one coil of the second coil unit.

An aspect of the present invention also provides a method of manufacturing a motor, including a step of assembling a stator using a stator member manufactured by the aforementioned method, and assembling a rotor and the stator so that the rotor is rotatable with respect to the stator.

The present invention can provide a coil unit, a stator member, a stator, a motor, and methods of manufacturing these, configured to achieve downsizing and simplified manufacturing steps.

BRIEF DESCRIPTION OF THE FIGURES

FIGS. 1A-AC include diagrams illustrating a coil unit of the present embodiment, in which FIG. 1A is an external perspective view.

FIGS. 2A-D include diagrams illustrating a bus bar of the present embodiment, in which FIG. 2A is a top view, FIG. 2B is a front view, and FIG. 2C is a side view.

FIGS. 3A-H include diagrams illustrating a coil of the present embodiment, in which FIG. 3A is an external perspective view, FIG. 3B is a front view, FIG. 3C is a rear view, FIG. 3D is a side view, FIG. 3E is a top view, FIG. 3F is a front view, and FIG. 3G is a cross-sectional view of FIG. 3F.

FIGS. 4A-4C include diagrams illustrating a stator member of the present embodiment, in which FIG. 4A is an external perspective view, FIG. 4B is a front view, and FIG. 4C is a top view.

FIGS. 5A-5C include diagrams illustrating the coil unit of the present embodiment, in which FIG. 5A is an external perspective view, FIG. 5B is a front view, and FIG. 5C is a top view.

FIGS. 6A-6C include diagrams illustrating the coil unit of the present embodiment, in which FIG. 6A is an external perspective view, FIG. 6B is a front view, and FIG. 6C is a top view.

FIGS. 7A-7C include diagrams illustrating the coil unit of the present embodiment, in which FIG. 7A is an external perspective view, FIG. 7B is a front view, and FIG. 7C is a top view.

DETAILED DESCRIPTION OF THE DISCLOSURE

An embodiment of the present invention will be described below with reference to the drawings.

Figure 1C:
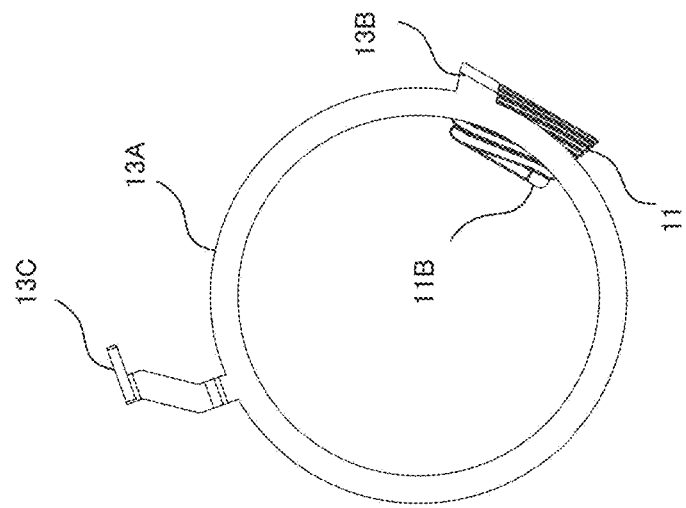
FIG. 1C is a top view.
Figure 1B:
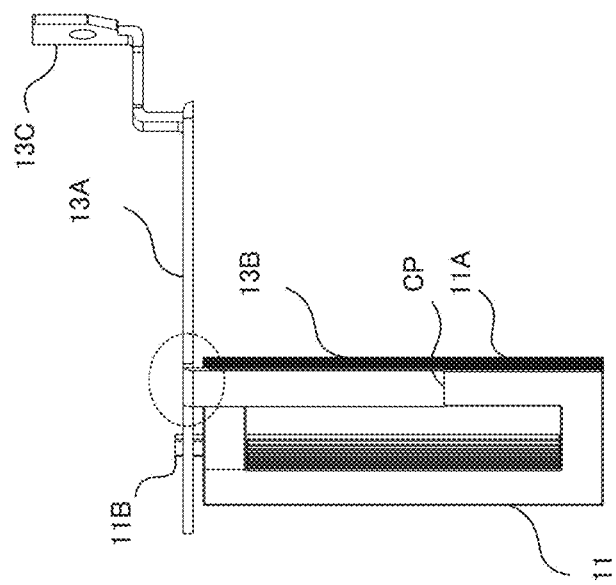
FIG. 1B is a front view.
Figure 1A:
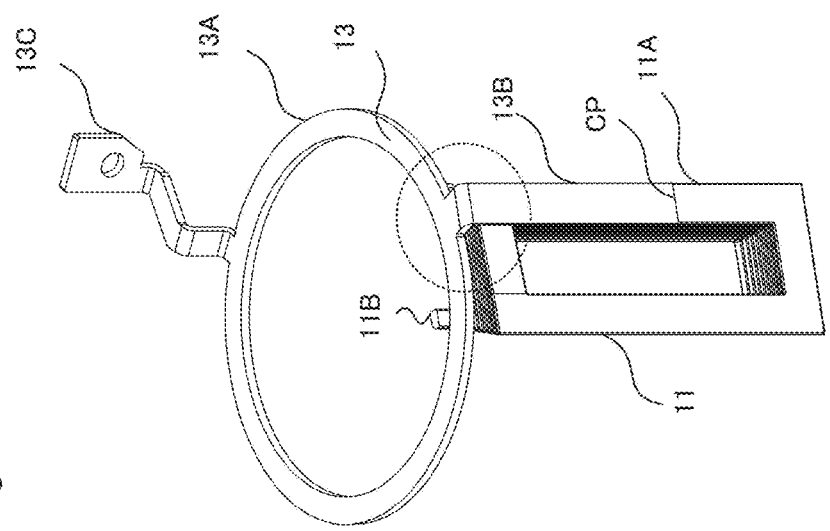

FIGS. 1A-1C include external views of a coil unit 10 of the present embodiment, in which FIG. 1A is a perspective view, FIG. 1B is a front view, and FIG. 1C is a top view. As illustrated in FIGS. 1A-1C, the coil unit 10 of the present embodiment includes a coil 11 and a bus bar 13 to which the coil 11 is connected. More specifically, the bus bar 13 includes, for example, a substantially annular (for example, circular or polygonal) wiring portion 13A, and a connection end portion 13B (hereinafter referred to as "coil connection end portion 13B") led out from the wiring portion 13A to be connected with the coil 11. In the present embodiment, a welded product of the coil 11 and the bus bar 13 illustrated in FIGS. 1A-1C is referred to as the coil unit 10.

FIGS. 2A-2D include diagrams illustrating the bus bar 13 before being welded, in which FIG. 2A is a plan view (top view) after punching process, FIG. 2B is a front view of only the bus bar 13 extracted from the coil unit 10 illustrated in FIGS. 1A-1C, and FIG. 2C is a side view (as viewed from an arrow of FIG. 2B) viewed from a tip end side of the connection end portion 13B.

For example, the bus bar 13 is configured by the circular wiring portion 13A and the coil connection end portion 13B, which are integrally constituted by a punching process of a metal member (for example, a copper plate). The connection end portion 13B is punched out so as to be led out from the wiring portion 13A toward a peripheral direction (outward direction from a center axis direction of the circular wiring portion 13A).

The coil connection end portion 13B is rectangular in plan view (FIGS. 2A and 2B), and as illustrated in FIG. 2C, an end face 13S on a tip end side of the coil connection end portion 13B (a cross section perpendicular to a longitudinal direction) is also rectangular. More specifically, the coil connection end portion 13B is a strip member including two wider surfaces WS opposite to each other and two narrower surfaces TS opposite to each other and extending long in a prescribed direction. The cross section (cross section along line A-A of FIG. 2A) orthogonal to a strip longitudinal direction BL, that is, the end face 13S, is rectangular (FIG. 2C) or rectangular with rounded corners (FIG. 2D). In the following description, the case (FIG. 2C) where the cross section (end face 13S) orthogonal to the strip longitudinal direction BL is rectangular will be described as an example.

The wiring portion 13A is also provided with an external terminal 13C for connection to, for example, an external battery or the like. Like the coil connection end portion 13B, the external terminal 13C is also integrally formed with the wiring portion 13A by the punching process, and is bent into a desired shape as the coil unit 10 (FIG. 2B).

FIGS. 3A-3H include diagrams illustrating the coil 11, in which FIG. 3A is an external perspective view, FIG. 3B is a front view of the coil 11 as viewed from the direction of an axial center of its helical structure, FIG. 3C is a rear view, FIG. 3D is a left side view of, for example, FIG. 3B, FIG. 3E is a top view of FIG. 3B, FIG. 3F is a front view of one end portion 11A extracted from the coil 11, and FIG. 3G is a cross-sectional view along line B-B of FIG. 3F.

The coil 11 is what is called an edgewise coil, with both ends 11A and 11B having the shape of flat conductors. Specifically, the coil 11 is configured to include the helical structure body by pressure-welding a plurality of strip-shaped flat conductors. As described later in detail, a plurality of flat conductors are prepared so as to have a length equal to or less than a length of a region CR for one turn of the helical structure body (a rectangular region corresponding to one turn illustrated in FIG. 3B). End faces in respective linear portions of the plurality of flat conductors are pressed (cold pressure welding) along the strip longitudinal direction BL to form the region CR for one turn in a substantially rectangular shape. This process is repeated until a desired number of turns is obtained. Thus, the helical structure body is formed. In other words, both the ends 11A and 11B of the coil 11 are a part of the plurality of flat conductors constituting the helical structure body.

In the present embodiment, one end portion 11A of both the ends of the coil 11 serves as an end portion (hereinafter referred to as "bus bar connection end portion 11A") that is connected to the bus bar 13. As illustrated in FIGS. 3A and 3B, the end portion 11A is positioned on the way to a turn in the region CR for one turn of the helical structure of the coil 11 (on the way to a longer side of the rectangular region CR for one turn). The other end portion 11B is configured so as to position (be led), for example, outside the helical structure, that is, on an extension of a longer side of the region CR for one turn.

As illustrated in FIGS. 3F and 3G, the bus bar connection end portion 11A of the coil 11 is also a strip member including two wider surfaces WS opposite to each other and two narrower surfaces TS opposite to each other and extending long in a prescribed direction. The cross section orthogonal to the strip longitudinal direction BL (cross section taken along line B-B of FIG. 3F), that is, an end face 11S of the bus bar connection end portion 11A, is rectangular (FIG. 3G) or rectangular with rounded corners (FIG. 3H). In the entire following description, the case (FIG. 3G) where the cross section (end face 11S) orthogonal to the strip longitudinal direction BL is rectangular will be described as an example.

Here, the coil connection end portion 13B of the bus bar 13 illustrated in FIGS. 1 and 2 is configured into a shape (size) corresponding to, for example, the shape of the flat conductor of the bus bar connection end portion 11A of the coil 11. Specifically, the end face 11S (face perpendicular to a helical traveling direction of the helical structure body) of the bus bar connection end portion 11A and the end face 13S of the coil connection end portion 13B of the bus bar 13 are configured to be rectangular and to have an equal size (a substantially consistent rectangle shape) so that the shape of the end face 11S is substantially consistent with the shape of the end face 13S.

As illustrated in FIGS. 1A-1C, the coil connection end portion 13B and the bus bar connection end portion 11A are welded by cold pressure welding with their end faces (the end face 11S and end face 13S) being butted, and thereby the coil unit 10 is formed. In the coil unit 10, the bus bar 13 and the coil 11 are integrally coated with a resin.

A welded portion CP between the coil connection end portion 13B and the bus bar connection end portion 11A is positioned on the way to a turn of the helical structure of the coil 11. More specifically, the coil 11 and the bus bar 13 are connected so that the welded portion CP is positioned in a linear portion of the flat conductors which constitute the helical structure body of the coil 11 (for example, a linear portion of the flat conductors constituting a longer side of the rectangular region CR for one turn of the helical structure body). For ease of explanation, the welded portion CP is specified in each drawing of the present embodiment.

However, since cold pressure welding is achieved by bonding of metal atoms, the welded portion CP is reliably welded to such an extent that the positions of the end face 11S and the end face 13S are not visually recognizable.

Although one coil 11 is connected to one bus bar 13 in this example, the number of the coils 11 to be connected may be optional. In that case, the coil connection end portions 13B of the bus bar 13 are provided in accordance with the number of the coils 11. For example, the coil unit 10 of a certain phase (single phase) is configured by connecting the plurality of coils 11 having identical structure in a circumferential direction of the wiring portion 13A of the bus bar 13.

In such a configuration, the welded portion CP between the bus bar 13 and the coil 11 has a configuration where the end face 11S of the bus bar connection end portion 11A and the end face 13S of the coil connection end portion 13B are simply butted. Hence, the welded portion CP can be made into a necessary minimum size. In short, as compared with the conventional structure where the bus bar and the coil are connected by welding, screwing or the like, the coil unit 10 can be downsized.

In the present embodiment, since the welded portion CP can be disposed on the way to a turn of the helical structure of the coil 11, a vicinity of the wiring portion 13A of the bus bar 13 and an upper end portion of the coil 11 that is conventionally the connected portion between the bus bar and the coil (a vicinity of a broken line circle illustrated in FIGS. 1A and 1B) can be configured with only a bending structure of the coil connection end portion 13B of the bus bar 13. In other words, as compared with the conventional structure where the connected portion is disposed in that position (upper end portion of the coil 11), the upper end of the coil 11 can be made into a necessary minimum size. This can also downsize the coil unit 10.

Next, a stator member 20 in the present embodiment will be described with reference to FIGS. 4A-7C. Here, the case of the stator member 20 which constitutes a three-phase motor will be described as one example.

Figure 5C:
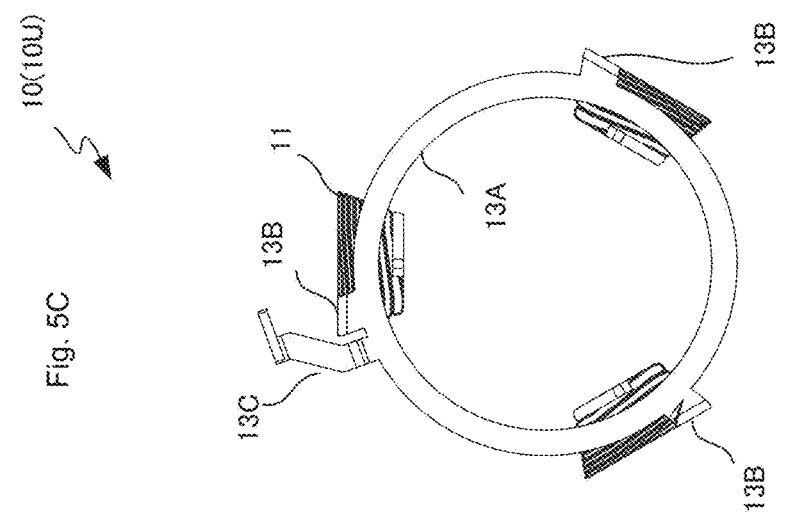
Figure 5B:
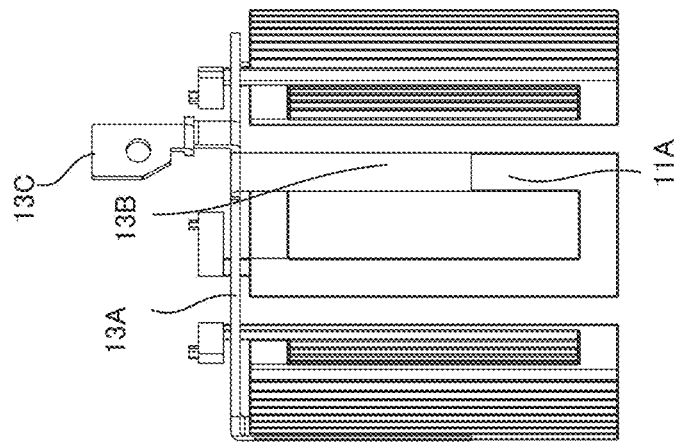
Figure 5A:
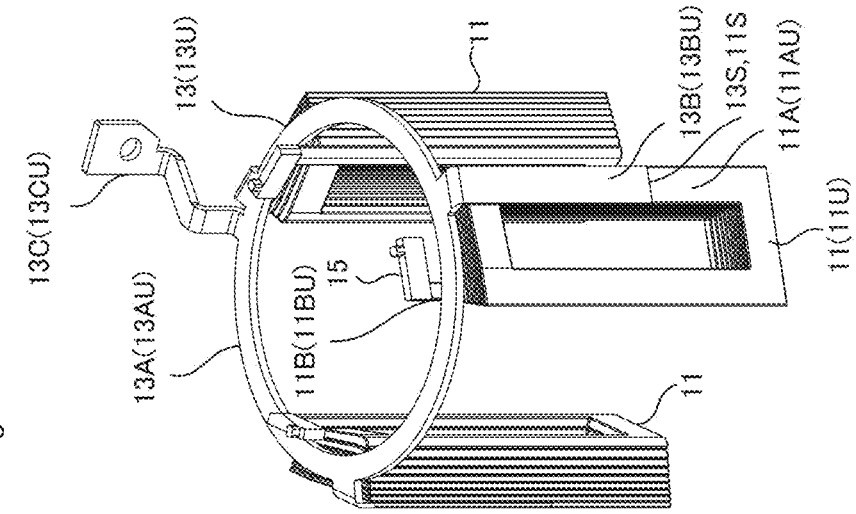
Figure 7C:
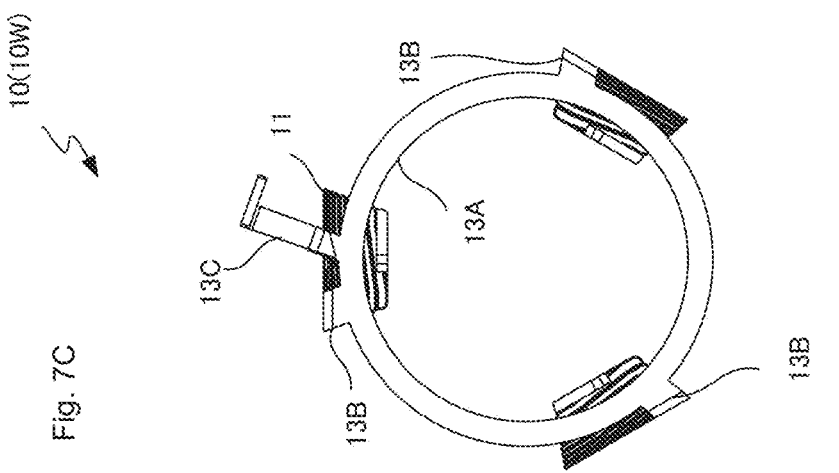
Figure 7B:
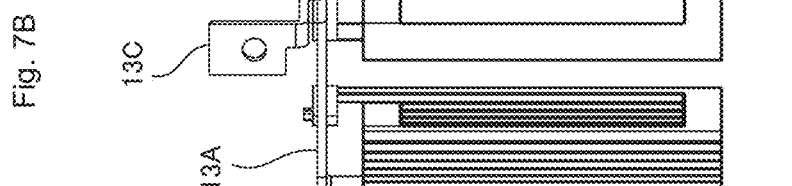
Figure 7A:
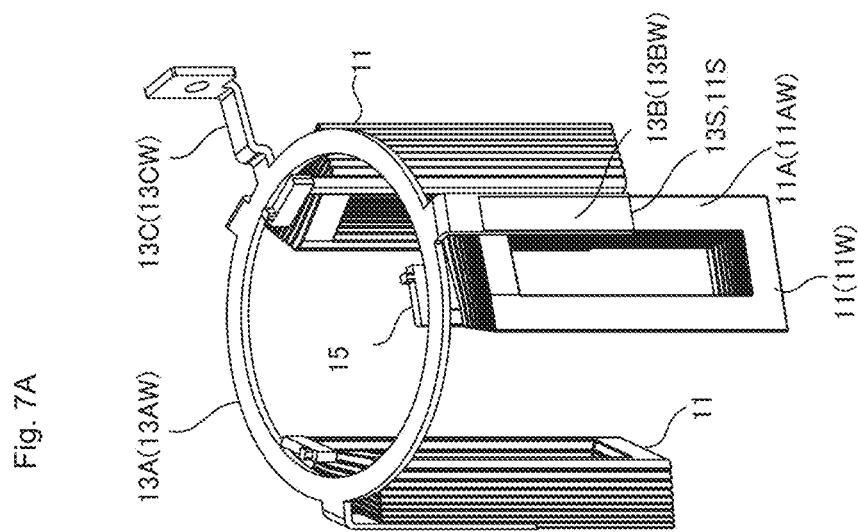

FIGS. 4A-4C include diagrams illustrating the stator member 20, in which FIG. 4A is an external perspective view, FIG. 4B is a front view, and FIG. 4C is a top view. FIGS. 5A-5C include diagrams illustrating a U-phase coil unit 10, in which FIG. 5A is an external perspective view, FIG. 5B is a front view, and FIG. 5C is a top view. FIGS. 6A-6C include diagrams illustrating a V-phase coil unit 10, in which FIG. 6A is an external perspective view, FIG. 6B is a front view, and FIG. 6C is a top view. FIGS. 7A-7C include diagrams illustrating a W-phase coil unit 10, in which FIG. 7A is an external perspective view, FIG. 7B is a front view, and FIG. 7C is a top view.

As illustrated in FIGS. 4A-4C, the stator member 20 constituting a three-phase motor is formed by assembling three coil units 10 (aforementioned coil units 10) having an identical number of turns so as to be disposed at equal intervals (120°). The three coil units 10 include, for example, a U-phase coil unit 10U, a V-phase coil unit 10V, and a W-phase coil unit 10W.

With reference to FIGS. 5A-5C, the U-phase coil unit 10U includes a plurality of (for example, three) coil connection end portions 13BU provided so as to be separated in a circumferential direction of a wiring portion 13AU of a bus bar 13U.

The coil connection end portions 13BU are provided so as to be separated by a prescribed distance in the circumferential direction of the circular wiring portion 13AU. Specifically, the coil connection end portions 13BU are provided at equal intervals so as to be at positions 120° from each other on the circular wiring portion 13AU. The coil connection end portions 13BU are similar in configuration to the coil connection end portion illustrated in FIGS. 2A-2C and 3A-3H, except for the number thereof. The plurality of coil connection end portions 13BU are connected to (bus bar connection end portions 11AU of) a plurality of coils 11U identical in configuration (in the number of turns), respectively.

Other ends 11BU of the coils 11U are provided with neutral point connection terminals 15 by welding or the like, respectively. The neutral point connection terminals 15 are provided so as to be positioned (led out to) outside the helical structure of the coils 11U and be connected to neutral points, respectively. An external terminal 13CU is bent into a desired shape.

Although the V-phase coil unit 10V illustrated in FIGS. 6A-6C and the W-phase coil unit 10W illustrated in FIGS. 7A-7C are similar in configuration to the U-phase coil unit 10U, the positions of coil connection end portions 13BV and 13BW, and the positions of external terminals 13CV and 13CW are provided at different positions (shifted positions) so as not to interfere with each other in the three coil units 10U, 10V, and 10W (see FIGS. 4A-4C).

Then, as illustrated in FIGS. 4A-4C, these three coil units 10U, 10V, and 10W are assembled so as to be different in phase of current or voltage from each other. In this instance, the bus bars 13U, 13V, and 13W of the three coil units 10U, 10V, and 10W are stacked so that their center axes are aligned.

In each of the three coil units 10U, 10V, and 10W, the coil 11 and the bus bar 13 are integrally coated with an insulating resin in the states (the states before being assembled) illustrated in FIGS. 5A-7C, respectively. More specifically, for example, the coil unit 10U is immersed in a liquid insulating resin, so that it is integrally coated with the insulating resin. As a result, the coil 11 of the coil unit 10U is coated with the insulating resin for each the region CR for one turn of a helical structure (an Nth turn of the coil and an N+1st turn of the coil are insulated). The liquid insulating resin may be sprayed to the coil unit 10U to integrally coat the coil unit 10U with the insulating resin. Then, the coil units 10U, 10V, and 10W coated with the insulating resin are assembled as illustrated in FIGS. 4A-4C to constitute the stator member 20.

Figure 8A:
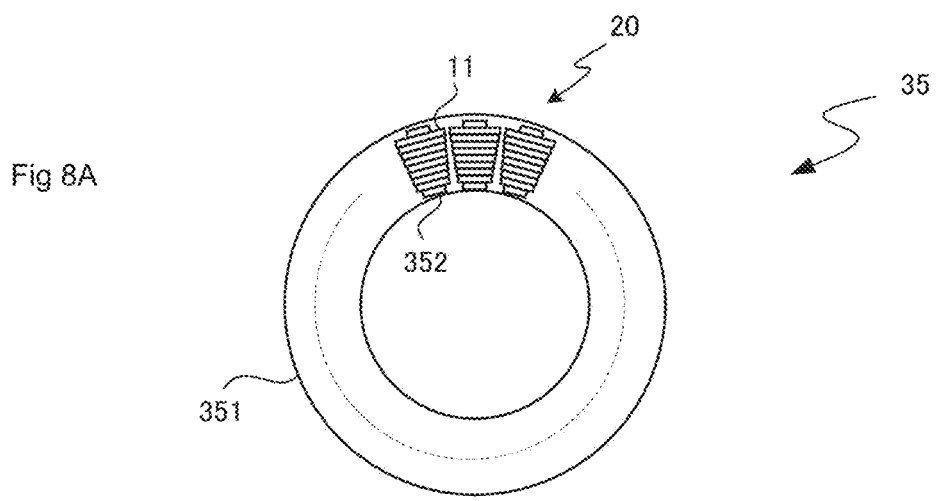
FIG. 8A is a top view illustrating the stator of the present embodiment.
Figure 8B:
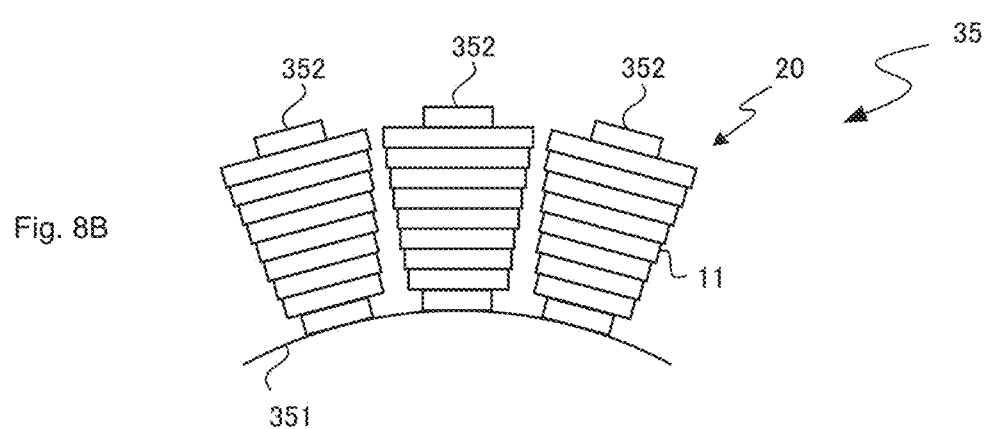
FIG. 8B is a partial enlarged view of FIG. 8B.
Figure 8C:
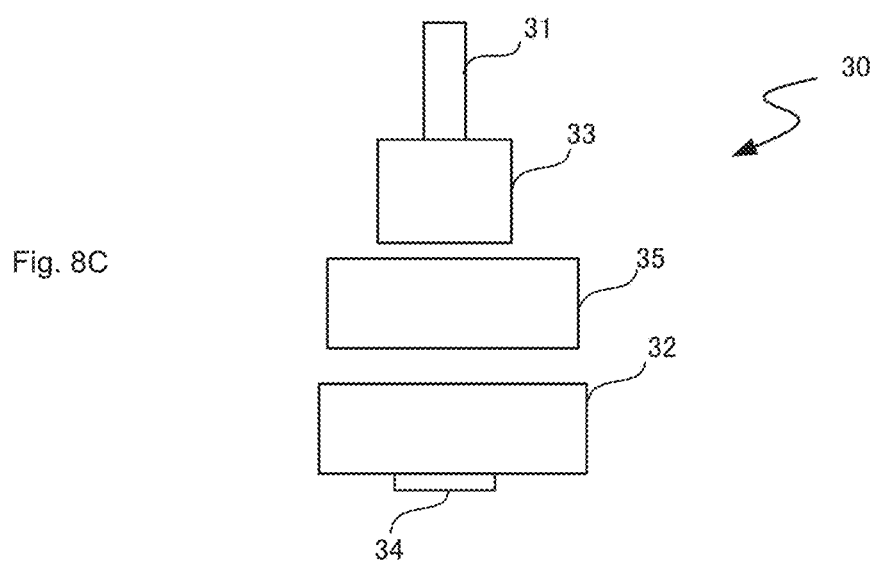
FIG. 8C is an exploded side view of a motor.

FIGS. 8A-8C include diagrams illustrating an outline of a stator 35 (FIGS. 8A and 8B) using the stator member 20 of the present embodiment, and a three-phase motor 30 (FIG. 8C) with use of the stator 35. FIG. 8A is a schematic view of an upper surface of the stator 35 as viewed from its axial direction, and FIG. 8B is a schematic view of the upper surface partially extracted from FIG. 8A. In both FIGS. 8A and 8B, the bus bar 13 is omitted. FIG. 8C is an exploded side view of the three-phase motor 30.

As illustrated in FIGS. 8A and 8B, the stator 35 includes, for example, a cylindrical stator core 351, a plurality of cassettes 352, and the aforementioned stator member 20. The stator member 20 of the present embodiment is post-fitted to the stator core 351. As described later in detail, the cassettes 352 are attached to the plurality of coils 11 which constitute the stator member 20 illustrated in FIGS. 4A-4C and are annularly disposed, respectively. The coils 11 are then attached to the stator core 351 to constitute the stator 35. Although only three coils 11 are illustrated in FIGS. 8A and 8B, the coils 11 with the cassettes 352 attached thereto are disposed along the entire circumference of the stator core 351.

As illustrated in FIG. 8C, a rotor 33 is assembled with respect to the aforementioned stator 35 to be rotatable, thereby obtaining the three-phase motor 30. Specifically, the three-phase motor 30 includes, for example, a shaft 31, a housing 32, the rotor 33, and the stator 35. The shaft 31 is a columnar member, and rotates around its center axis while being supported by a bearing 34 provided in the housing 32, for example. The shaft 31 has one end connected with a driving target device (not illustrated) through a power transmission mechanism such as a gear.

The rotor 33, which has a magnet (not illustrated) disposed in the circumferential direction, rotates with the shaft 31. For example, the stator 35 is disposed outside in a radial direction of the rotor 33 to generate a force for rotating the rotor 33. The external terminals 13CU, 13CV, and 13CW (see FIGS. 4A-4C) of the stator 35 are connected to a drive circuit or a power source (not illustrated) which supplies electric power to the motor through a lead wire or the like.

In the three-phase motor 30, when a drive current is given to the coils 11 from a power source or a drive circuit through the bus bar 13, a magnetic flux is generated in the cassettes 352 of the stator 35. With the effect of the magnetic flux between the cassettes 352 and the magnet (not illustrated), circumferential torque is generated. As a result, the rotor 33 rotates around its center axis with respect to the stator 35.

Although the present embodiment has been described by taking the three-phase motor 30 and the stator member 20 which constitutes the three-phase motor 30 as examples, the stator member 20 may also be configured as the stator member 20 for a single-phase motor by connecting the plurality of coils 11 having identical structure so as to be adjacent to each other in the circumferential direction of the wiring portion 13A of one bus bar 13. For example, nine coil connection end portions 13B are provided in the wiring portion 13A of the bus bar 13 illustrated in FIGS. 5A-5C at equal intervals along the circumferential direction, and the bus bar connection end portions 11A of the coils 11 are connected to these coil connection end portions 13B, respectively. This makes it possible to provide a single-phase stator member 20 (which can also be referred to as a coil unit 10) having nine coils 11 connected so as to be adjacent along the circumferential direction of the wiring portion 13A of one bus bar 13 as illustrated in FIGS. 4A-4C. Moreover, a single-phase motor can be obtained by assembling the rotor 33 to the stator 35 including the single-phase stator member 20 so that the rotor 33 is rotatable.

Figure 9A:
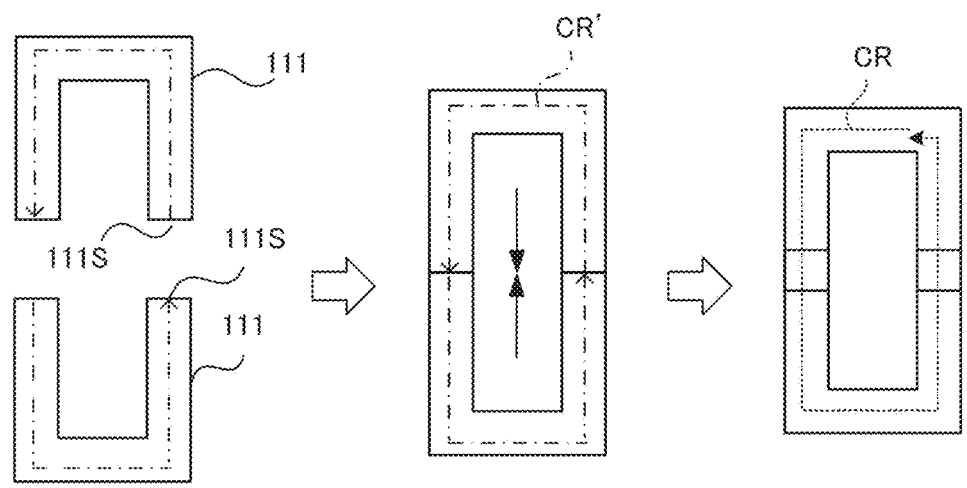
FIGS. 9A-9B include diagrams illustrating a method of manufacturing the coil of the present embodiment.
Figure 9B:
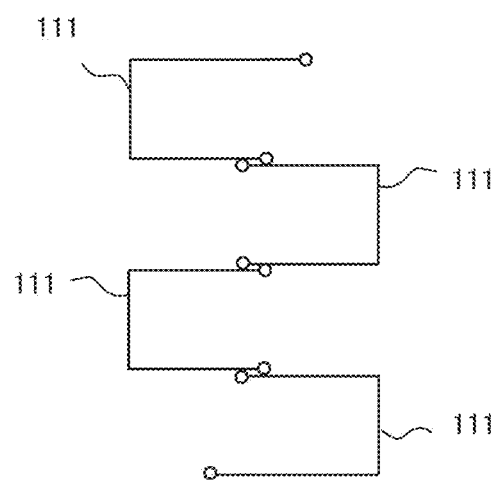

Hereinafter, with reference to FIGS. 9A-14C, a method of manufacturing the U-phase coil unit 10U will be described as one example. First, FIGS. 9A-9B include schematic views illustrating one example of the method of manufacturing the coil 11 of the present embodiment, in which FIG. 9A is a plan view illustrating a flat conductor 111 constituting a region CR for one turn of the coil 11, and FIG. 9B is a development view illustrating the process of welding the flat conductor 111. FIGS. 10A-14C are diagrams illustrating methods of manufacturing the bus bar 13 and the coil unit 10U.

First, with reference to FIGS. 9A-9B, the coil 11 of the present embodiment is configured to include a helical structure body by continuously pressure-welding the strip-shaped flat conductors 111. Specifically, the coil 11 is manufactured by the method disclosed in Japanese Patent No. 5592554 possessed by the applicant of this patent application. The method may simply be described as follows. First, as illustrated in FIG. 9A, a plurality of flat conductors 111 having a length that is equal to or less than the length of the region CR for one turn of the helical structure body is prepared. The flat conductors 111 are each a copper plate or the like which is punched into a U shape (a shape of Japanese katakana "ko"). The flat conductors 111 can be formed into a helical structure body in a virtual state (hereinafter referred to as "virtual helical structure body") by butting their end faces ((shorter side) end faces perpendicular to a strip longitudinal direction) 1115 against each other. The virtual helical structure body is configured such that a length of a region CR' for one turn, which is constituted of a half-turn portion in one direction of a helical traveling direction, (a half-turn portion that is an upper part of the flat conductor 111 illustrated by a chain line in FIGS. 9A and 9B) and a half-turn portion in the other direction (a half-turn portion that is a lower part of the flat conductor 111 illustrated with a chain line in FIGS. 9A and 9B) based on butted points between the end faces 1115 of two flat conductors 111, is set to be longer by a pressing amount of the pressure welding than a length (a left diagram of FIG. 9A) of the region CR for one turn of the helical structure body that is to be used as the coil 11.

As illustrated in FIG. 9B, the end faces 1115 in respective linear portions of the plurality of flat conductors 111 are pressed along the strip longitudinal direction. Accordingly, the end faces 1115 are pressure-welded and connected while a distance in the strip longitudinal direction is reduced, and thereby a connected flat conductor is formed. The connected flat conductor is formed so that a length of a region CR for one turn of the connected flat conductor is consistent with a length of the region CR for one turn of the helical structure body. This makes it possible to obtain the coil 11 having the region CR for one turn of a spiral, the region CR being in the shape of a rectangle having shorter sides and longer sides as viewed from the center axis direction of the helical structure body.

Although the case where the plurality of flat conductors 111 have an identical shape is illustrated in FIGS. 9A and 9B, the plurality of flat conductors 111 may have the wider surface WS and the narrower surface TS different in shape from each other, on the assumption that the shapes of the end faces 1115 to be butted are consistent. More specifically, in a certain flat conductor 111, the wider surface WS may gradually become narrower (wider) in the strip longitudinal direction (helical traveling direction), and the narrower surface TS may gradually become larger (smaller). In the coil 11 illustrated in FIGS. 3A-3C, each of the flat conductors 111 is configured to be shaped so that the wider surface WS gradually becomes narrower and the narrower surface TS gradually becomes larger from the end portion 11A toward the end portion 11B (the shapes of the end faces 11S to be butted are made to be consistent with each other). The shapes of the flat conductors 111 to be butted are not limited to the same U shape, but may be such shapes as a C shape and an I shape.

As illustrated in FIGS. 3A-3C, the coil 11 has a starting edge (end portion 11A) and an end edge (end portion 11B) of the helical structure body at different positions in a helical traveling direction. Specifically, the bus bar connection end portion 11A that is one end portion is positioned on the way to a turn of the region CR for one turn of the helical structure body, that is, on the way to a longer side of the rectangular region CR for one turn. The other end portion (other end portion) 11B is led out (projects) from the helical structure body in the direction of the bus bar 13 when the coil unit 10 is configured (upward when the coil unit 10 is configured by the shorter side of the coil 11; upward in an axis direction of the stator core 351).

Figure 10A:
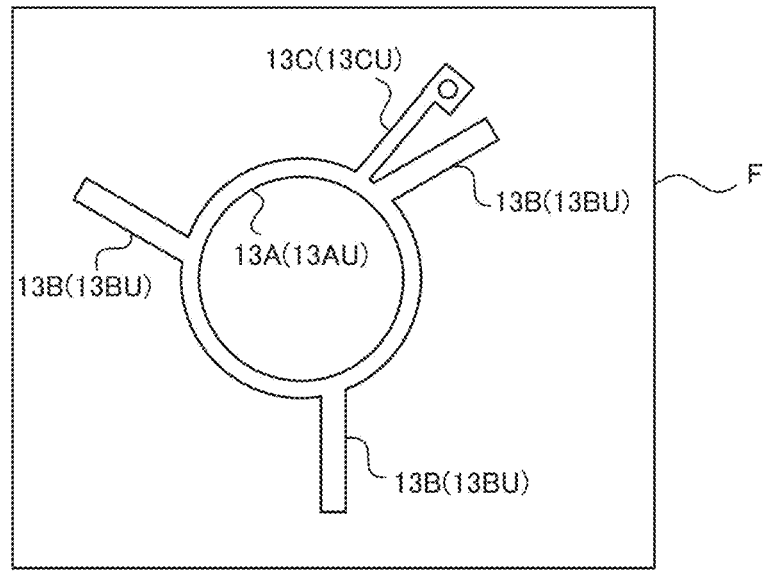
FIGS. 10A-10B include diagrams illustrating a method of manufacturing the coil unit of the present embodiment.

With reference to FIG. 10A, the bus bar 13 (13U) is first cut out as a flat plate body integrally including a circular wiring portion 13A (13AU), a coil connection end portion 13B (13BU), and an external terminal 13C (13CU) through punching process of a plate-like metal member F (for example, a copper plate, etc.). The coil connection end portion 13B is punched out into a rectangular shape (strip shape) so as to be led out from the wiring portion 13A toward its peripheral direction (outward direction from a center axis direction of the circular wiring portion 13A).

Also in this example, in order to connect the bus bar 13 to three coils 11, three coil connection end portions 13B are formed so as to be separated at equal intervals (120°) in the circumferential direction of the wiring portion 13A and to extend in a substantially radial direction. As illustrated in FIGS. 2A-2C, the coil connection end portion 13B is rectangular in plan view, and the end face 13S on its tip end side (cross section perpendicular to the longitudinal direction) is also rectangular. The external terminal 13C (13CU) is formed at a position different from the coil connection end portions 13B.

Figure 10B:
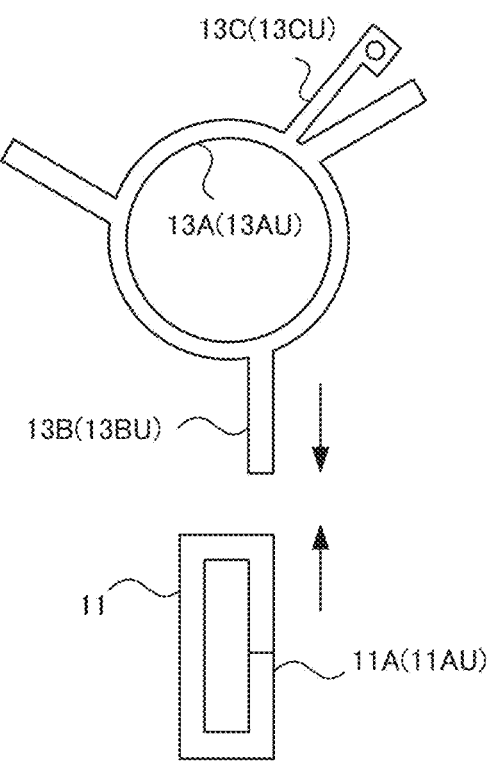

As illustrated in FIG. 10B, immediately after punching, the wiring portion 13A, the coil connection end portions 13B, and the external terminal 13C have a flat plate shape so as to be positioned on a substantially identical plane. Then, the bus bar 13 and the coil 11 are welded by cold pressure welding.

Figure 11A:
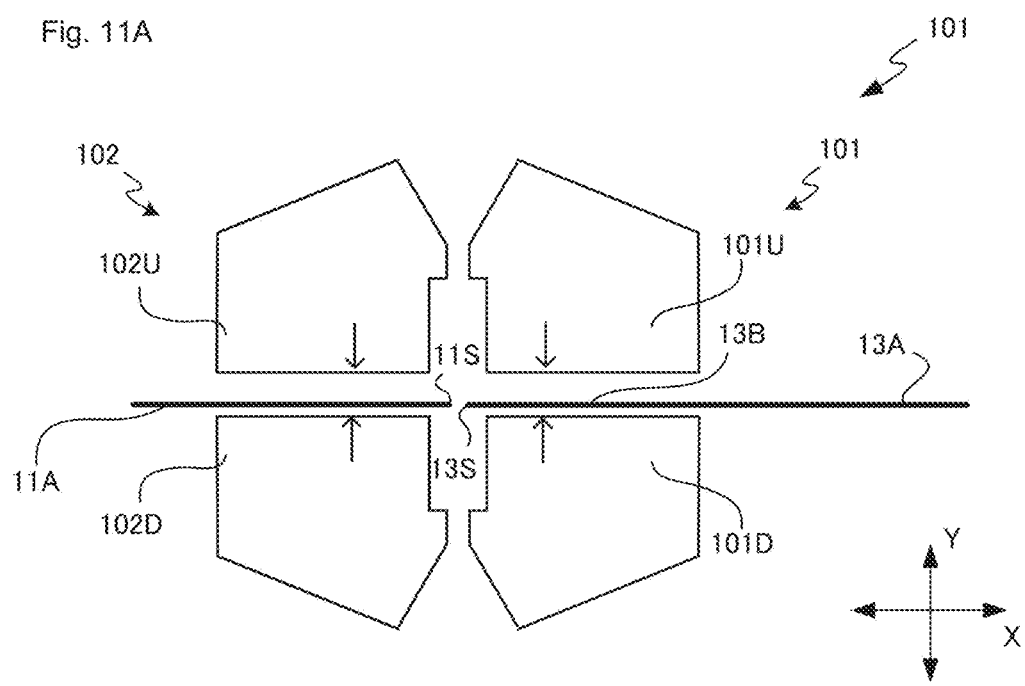
FIGS. 11A-11B include diagrams illustrating a method of manufacturing the coil unit of the present embodiment.
Figure 11B:
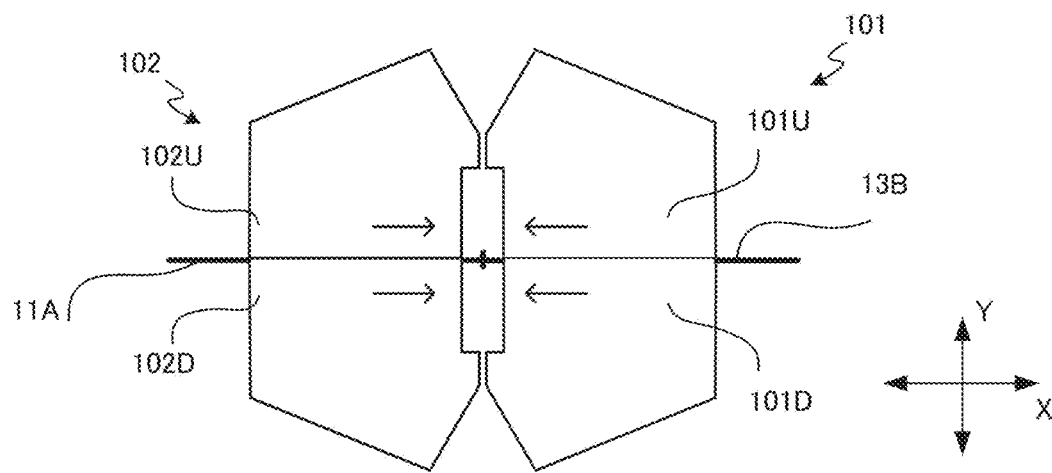

FIGS. 11A-11B include front views illustrating the outline of a welding apparatus (cold pressure welding apparatus) 100 for cold pressure welding. The pressure welding apparatus 100 includes, for example, a first holding part 101 and a second holding part 102 capable of moving so as to be closer to or distanced from each other in a horizontal direction (X axis direction illustrated in the figure). The first holding part 101 includes, for example, a first upper holder 101U and a first lower holder 101D which are opened and closed in a vertical direction (Y axis direction illustrated in the figure). With the first upper holder 101U and the first lower holder 101D, the first holding part 101 holds, for example, the wider surface WS of the coil connection end portion 13B of the bus bar 13. The second holding part 102 also includes, for example, a second upper holder 102U and a second lower holder 102D which are opened and closed in a vertical direction (Y axis direction illustrated in the figure). With the second upper holder 102U and the second lower holder 102D, the second holding part 102 holds, for example, the wider surface WS of the bus bar connection end portion 11A of the coil 11.

More specifically, the first holding part 101 maintains the flat plate shape so that the wiring portion 13A and the coil connection end portion 13B of the bus bar 13 are positioned on a substantially identical plane, and retains one of the coil connection end portions 13B. The second holding part 102 retains the bus bar connection end portion 11A so that the end face 11S of the bus bar connection end portion 11A of the coil 11 faces the end face 13S of the coil connection end portion 13B of the bus bar 13 (FIG. 11A).

The pressure welding apparatus 100 moves the first holding part 101 and the second holding part 102 so that they are brought into close to each other (moves them toward the center along the X axis direction illustrated in this example). The pressure welding apparatus 100 then performs welding by cold pressure welding with the end face 13S of the coil connection end portion 13B and the end face 11S of the bus bar connection end portion 11A being butted (FIG. 11B). As a consequence, the butted position of the end faces 11S and 13S serves as a welded portion CP. The welded portion CP is positioned on the way to a turn of the helical structure body of the coil 11, that is, on the way to a longer side of the rectangular region CR for one turn. Here, longitudinal lengths of the bus bar connection end portion 11A and the coil connection end portion 13B before welding are each set to be longer by a margin than the lengths after welding so that the welded portion CP between the coil 11 and the bus bar 13 is positioned on the way to a turn of the region CR for one turn. Then, by setting a distance reduced by cold pressure welding as the margin, welding is conducted so that the welded portion CP is positioned on the way to a turn of the region CR for one turn (see FIG. 9A).

In the present embodiment, the welded portion CP is positioned in the vicinity of the center of the longer side of the region CR for one turn of the coil 11. However, without being limited thereto, the welded portion CP may be positioned on an upper side than the illustrated position, or may be positioned on a lower side than the illustrated position. The welded portion CP may also be positioned on the way to a turn of the region CR for one turn, instead of the position projecting (led out) from the coil 11. For example, the welded portion CP may be positioned on the shorter side of the region CR for one turn.

After pressing, in the first holding part 101, the first upper holder 101U and the first lower holder 101D move so as to be separated along the Y axis direction. In the second holding part 102, the second upper holder 102U and the second lower holder 102D move so as to be separated along the Y axis direction, so that the held bus bar 13 and coil 11 are released. Then, the first holding part 101 and the second holding part 102 move so as to be separated along the X axis direction, and return to initial positions.

The cold pressure welding apparatus 100 can perform cold pressure welding of both the bus bar 13 and the coil 11 by one pressing. However, it is desirable that pressing is repeated a plurality of times for one welded portion to stabilize the welded surface. As one example, pressing (cold pressure welding) is repeated three or four times for one welded portion CP, thereby compressing the flat conductors by about 1 mm or more (preferably 1.5 mm or more, specifically about 2 mm). In this manner, stable welded surfaces can be obtained.

After the coil 11 and the bus bar 13 are cold pressure welded, a burr is generated in the welded portion CP due to the pressing. Therefore, the coil 11 and the bus bar 13 are taken out from the holding parts to remove the burr after completion of the cold pressure welding. Then, cold pressure welding is performed between the bus bar connection end portion 11A of another coil 11 and another coil connection end portion 13B of the bus bar 13.

Figure 12A:
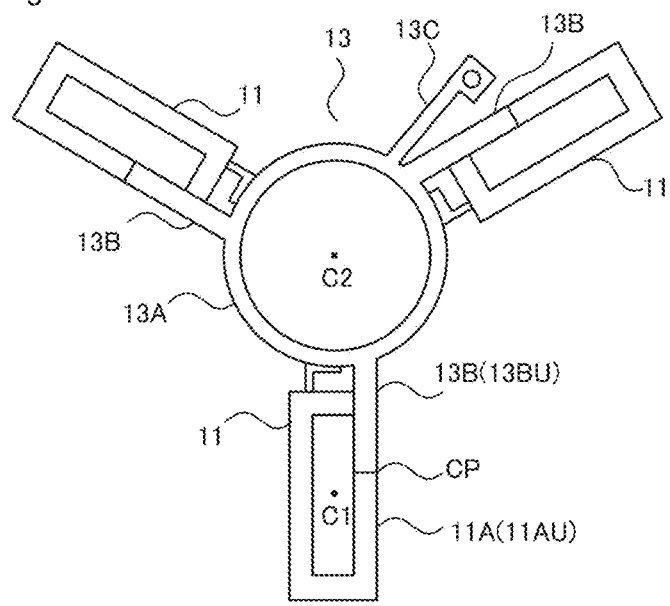
FIGS. 12A-12C include diagrams illustrating a method of manufacturing the coil unit of the present embodiment.
Figure 12B:
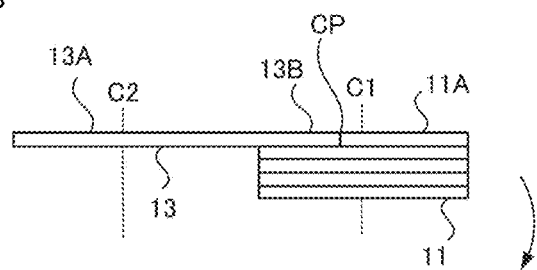
Figure 12C:
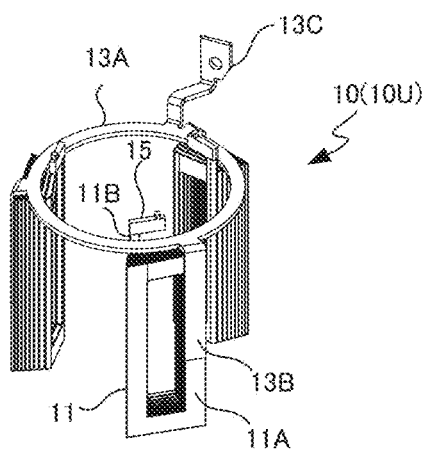

FIGS. 12A-12B include diagrams illustrating the coil 11 and the bus bar 13 after welding, in which FIG. 12A is a plan view, FIG. 12B is a side view, and FIG. 12C is an external perspective view of the coil unit 10 (10U).

The three coil connection end portions 13B of the bus bar 13 are welded to the coils 11 in a similar manner. As a result, a welded product of the coils 11 and the bus bar 13 is obtained as illustrated in FIG. 12A. In this state, the coil 11 and the bus bar 13 are disposed on a substantial plane so that a center axis direction (direction of a first central axis C1) of the helical structure body of the coil 11 and a center axis direction (direction of a second center axis C2) of the wiring portion 13A of the bus bar 13 are aligned as illustrated in FIGS. 12A and 12B.

Then, the coils 11 are each bent with respect to the bus bar 13 so that the first center axis C1 of each of the coils 11 intersects the second center axis C2 direction of the bus bar 13, as illustrated by an arrow of FIG. 12B. Thus, the coil unit 10U is formed such that the second center axis C2 direction of the bus bar 13 and a longer side direction of the region CR for one turn of the coil 11 are aligned in the same direction, and the wiring portion 13A of the bus bar 13 is positioned above the coil 11 (above an upper shorter side of the region CR for one turn) (FIG. 12C).

Then, the coils 11 and the bus bar 13 are integrally coated with an insulating resin. Specifically, the coil unit 10U is immersed in a liquid insulating resin, for example, so as to be integrally coated with the insulating resin. The liquid insulating resin may be sprayed to the coil unit 10U to integrally coat the coil unit 10U with the insulating resin.

In conventional cases, the coil coated with an insulating resin is connected to the bus bar by welding or screwing, and insulation between bus bars is achieved by interposing an insulating resin layer therebetween. Alternatively, the coil and the bus bar are individually coated with an insulating resin except for their welded portions, and after the coil and the bus bare are connected, their welded portions are coated anew with an insulating resin. Hence, the structure is complicated due to, for example, the necessity of a holder for an insulating resin layer, and the manufacturing process is thus complicated.

However, in the present embodiment, the coil and the bus bar can integrally be coated with an insulating resin after they are connected. Therefore, the structure and the manufacturing process can drastically be simplified as compared with those in the conventional cases. Moreover, uniformity of the film thickness of the insulating resin can be improved.

As illustrated in FIGS. 12A and 12B, the coils 11 and the bus bar 13 may be coated with an insulating resin in a substantially flat plate state after being welded (in the state before the coils 11 are bent). However, when the coils 11 are bent after being coated with an insulating resin, the insulating resin is extended and thereby a coating thickness is reduced in the vicinity of a bent point. This may cause deterioration of pressure resistance. Therefore, when the coils 11 and the bus bar 13 are integrally coated with an insulating resin in the state where the coils 11 are bent with respect to the bus bar 13 as illustrated in FIG. 12C, it is possible to enhance the uniformity of the film thickness of the insulating resin and avoid deterioration of pressure resistance.

The other end portions 11B of the coils 11 each have a neutral point connection terminal 15 attached thereto by welding or the like, for example. The neutral point connection terminal 15 is provided so as to be positioned (led out) outside the helical structure of each of the coils 11. The external terminal 13C of the bus bar 13 is bent into a desired shape.

Figure 13A:
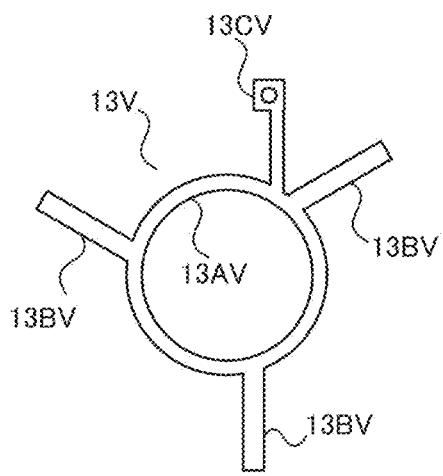
FIGS. 13A-13D include diagrams illustrating a method of manufacturing the coil unit of the present embodiment.
Figure 13B:
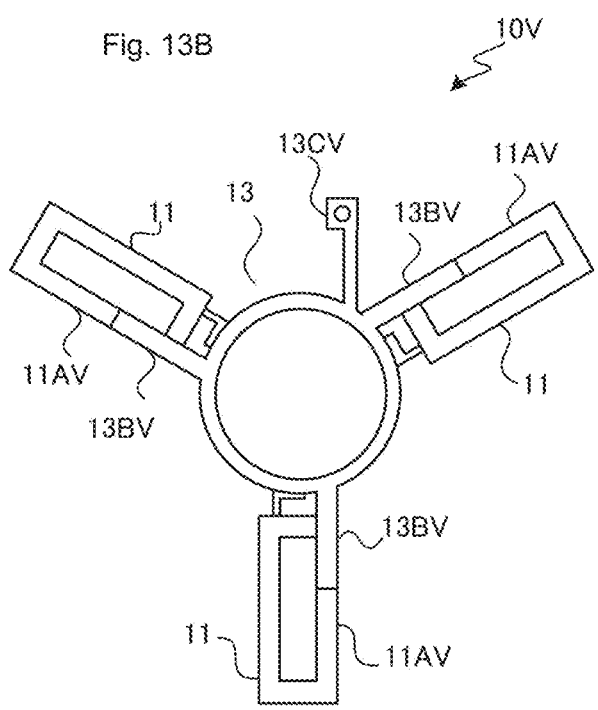

FIGS. 13A-13D include plan views of the coil units 10V and 10W. The coil units 10V and 10W are also manufactured in a similar manner. More specifically, as illustrated in FIG. 13A, in the bus bar 13V of the coil unit 10V, a wiring portion 13AV, coil connection end portions 13BV, and an external terminal 13CV are punched out, and the coil connection end portions 13BV and bus bar connection end portions 11AV of the coils 11 are connected in a similar manner (FIG. 13B).

Figure 13C:
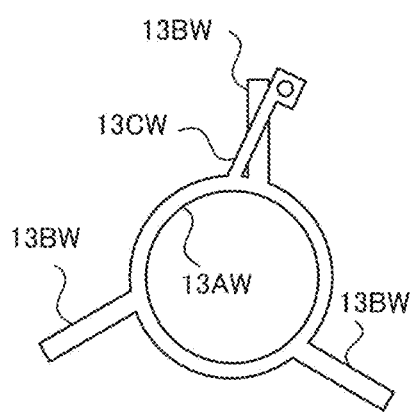
Figure 13D:
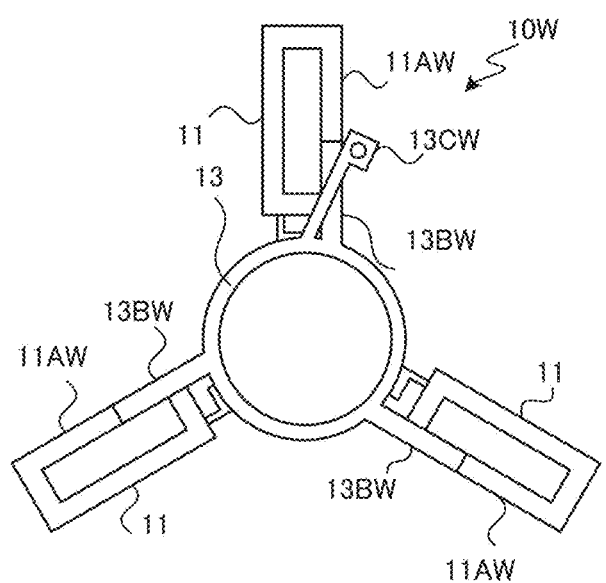

As illustrated in FIG. 13C, in the bus bar 13W of the coil unit 10W, a wiring portion 13AW, coil connection end portions 13BW, and an external terminal 13CW are punched out, and the coil connection end portions 13BW and bus bar connection end portions 11AW of the coils 11 are connected in a similar manner (FIG. 13D).

However, the positions of these three coil connection end portions 13BV and 13BW are shifted from the positions of the three coil connection end portions 13BU of the coil unit 10U. The positions of the external terminals 13CV and 13CW are also shifted from the position of the external terminal 13CU of the coil unit 10U. Hence, the coil connection end portions and the external terminals are provided at the positions not interfering with each other when the three coil units 10U, 10V, and 10W are assembled.

Then, in the coil units 10V and 10W, the coils 11 are each bent with respect to the bus bar 13 so that the first center axis C1 of the coils 11 intersects the second center axis C2 direction of the bus bar 13. Thus, the coil unit 10V (see FIGS. 6A-6C) and the coil unit 10W (see FIGS. 7A-7C) are formed so that the second center axis C2 direction of the bus bar 13 and a longer side direction of the region CR for one turn of the coil 11 are aligned in the same direction, and the wiring portion 13A of the bus bar 13 is positioned above the coil 11 (above an upper shorter side of the region CR for one turn).

The stator member 20 is formed by assembling the coil units 10U, 10V, and 10W (coated with an insulating resin) manufactured by the aforementioned method. As illustrated in FIGS. 4A-4C, the three coil units 10U, 10V, and 10W are assembled so as to be different in phase of current or voltage from each other and to be positioned adjacent to each other at equal intervals (120°). Moreover, the bus bars 13U, 13V, and 13W of the three coil units 10U, 10V, and 10W are stacked so that the center axes of the wiring portions 13AU, 13AV, and 13AW are aligned. As described before, the positions of the coil connection end portions 13BU, 13BV, and 13BW of the three coil units 10U, 10V, and 10W are shifted from each other, and the positions of the external terminals 13CU, 13CV, and 13CW are also shifted from each other. Hence, even when these coil units 10U, 10V, and 10W are assembled, the coils 11 and the external terminals 13CU, 13CV, and 13CW do not interfere with each other.

Then, the neutral point connection terminals 15 of the three coil units 10U, 10V, and 10W are connected to neutral points, and thereby the stator member 20 is formed.

Note that the coil unit 10U (FIG. 12A), the coil unit 10V (FIG. 13B), and the coil unit 10W (FIG. 13D) may individually be coated with an insulating resin in a state of being a substantially flat plate body; then, the coil unit 10U, the coil unit 10V, and the coil unit 10W may be stacked so that the center axes of the wiring portions 13AU, 13AV, and 13AW of the bus bars 13U, 13V, and 13W are aligned; and after that, the coils 11 to be connected to the bus bars 13U, 13V, and 13W may be bent.

Figure 14A:
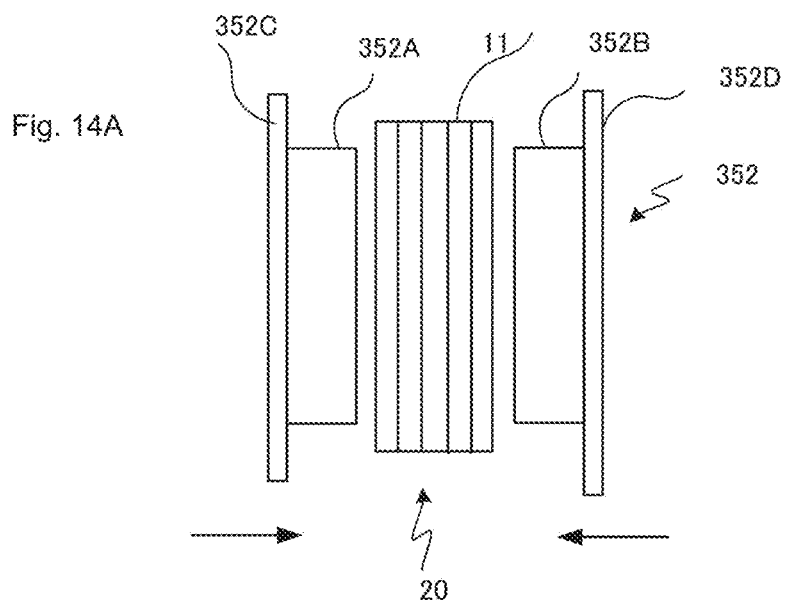
FIGS. 14A-14C include diagrams illustrating a method of manufacturing the stator of the present embodiment.
Figure 14B:
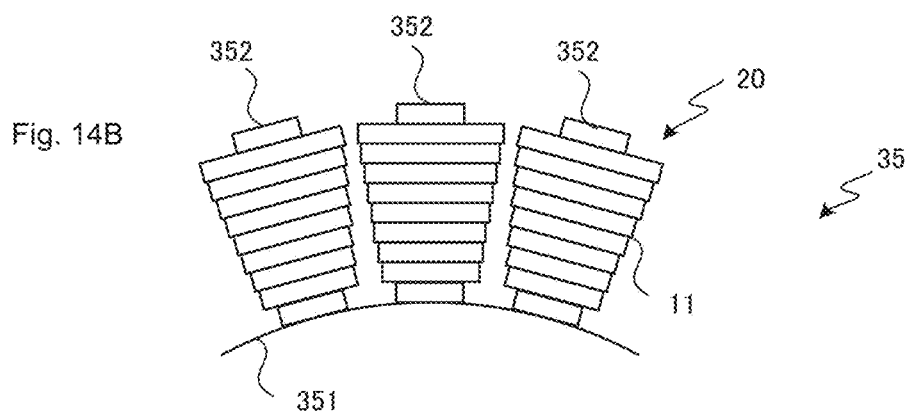
Figure 14C:
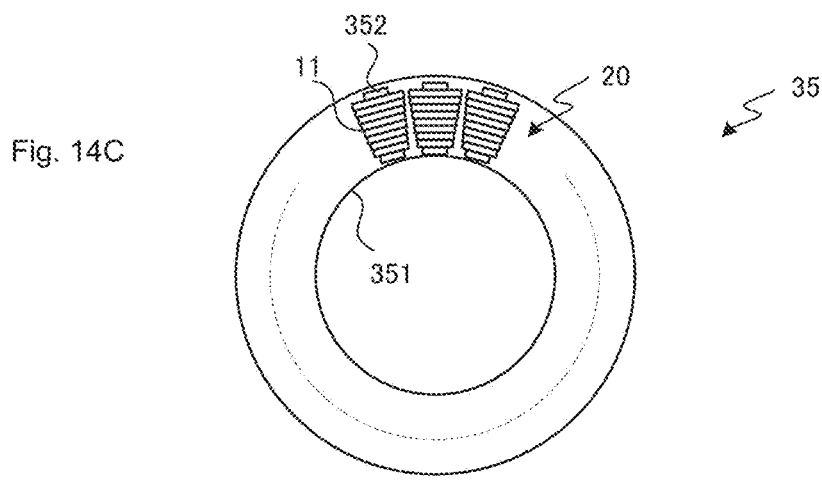

A method of manufacturing the stator 35 will be described with reference to FIGS. 14A-14C. The stator 35 includes, for example, a cylindrical stator core 351, a plurality of cassettes 352, and the aforementioned stator member 20. The stator member 20 of the present embodiment is post-fitted to the stator core 351.

For example, the cassettes 352 are prepared so that a set of two cassettes 352 is prepared for each of the coils 11 which constitute the stator member 20 (for one coil 11) as illustrated in FIG. 12A. Two cassettes 352 (352A, 352B) as one set each include flanges 352C and 352D on one and the other surface sides in the direction of an axial center of the helical structure of the coil 11. One coil 11 is inserted from the side of one cassette 352A where the flange 352C is not formed, and the other cassette 352B is placed over and engaged with the cassette 352A from the side where the flange 352D is not formed. Thus, the cassettes 352 are attached to the coil 11. The cassettes 352 are similarly attached to all the coils 11 which constitute the stator member 20. As illustrated in FIGS. 14B and 14C, the coils 11 having the cassettes 352 attached thereto are attached to the stator core 351. Thus, the stator 35 is configured.

As illustrated in FIG. 8C, the rotor 33 is assembled to be rotatable with respect to the aforementioned stator 35, thereby manufacturing the three-phase motor 30.

It should be noted that the present invention is not limited to the above-described embodiments, and it goes without saying that various modifications can be made without departing from the scope of the present invention. For example, in the aforementioned embodiment, copper (copper plate) has been described as one example of a metal member that constitutes the coil 11 and the bus bar 13. However, without being limited to copper, the metal member that constitutes the coil 11 and/or the bus bar 13 may be any metal members such as nonferrous metallic materials which can be cold pressure welded. Specifically, the metal members may be metal members of, for example, aluminum, aluminum alloys, copper-nickel alloys, brass, zinc, silver, silver alloys, nickel, gold, and other alloys. The metal members may also be members including tin plating, silver plating, and nickel plating. The coil 11 and the bus bar 13 may be the same metal members, or may be different metal members.

The present invention can be applied to a stator and a motor.

REFERENCE SIGNS LIST 10, 10U, 10V, 10W coil unit
11, 11U, 11V, 11W coil
11A, 11AU, 11AV, 11AW bus bar connection end portion
11B other end portion
11S end face
13, 13U, 13V, 13W bus bar
13AU wiring portion
13A, 13AU, 13AV, 13AW wiring portion
13B, 13BU, 13BV, 13BW coil connection end portion
13C, 13CU, 13CV, 13CW external terminal
13S end face
15 neutral point connection terminal
20 stator member
30 three-phase motor
31 shaft
32 housing
33 rotor
34 bearing
35 stator
100 welding apparatus (cold pressure welding apparatus)
101 holding part
101D lower holder
101U upper holder
102 holding part
102D lower holder
102U upper holder
111 flat conductor
111S end face
351 stator core
352 cassette

The invention claimed is:

1. A coil unit comprising:
a coil; and
a bus bar including a wiring portion and a connection end portion to which the coil is connected, wherein
one end of the coil and the connection end portion are welded by cold pressure welding with end faces of them being butted in a welded portion,
the end faces are a flat cross section orthogonal to a strip longitudinal direction,
the welded portion is provided on the way to a turn of and inside a helical structure of the coil,
the connection end portion is bendable with respect to the wiring portion, and
before the connection end portion is bent, at least one region for one turn of the coil and a face of the bus bar are disposed on a substantially parallel plane so that a center axis direction of the helical structure of the coil aligns with a center axis direction of the bus bar.

2. The coil unit of claim 1, wherein
the coil is configured to include a helical structure body by pressure-welding a strip-shaped flat conductor and the welded portion is provided in a linear portion of the flat conductor.

3. The coil unit of claim 2, wherein the coil is configured such that end faces in the respective linear portions of a plurality of the flat conductors are pressed along a strip longitudinal direction to form a substantially rectangular region for one turn.

4. The coil unit of claim 1, wherein the wiring portion is a substantially annular wiring portion, and a plurality of the coils are connected so as to be separated by a prescribed distance in a circumferential direction of the wiring portion.

5. The coil unit of claim 1, wherein, the coil and the bus bar are integrally coated with a resin.

6. A stator member comprising a plurality of the coil units of claim 1, wherein
the plurality of coil units includes a first coil unit and a second coil unit, and
the first coil unit and the second coil unit are assembled so that one coil of the first coil unit is different in phase of current or voltage from one coil of the second coil unit.

7. A motor comprising the stator member of claim 6.

8. A method of manufacturing a coil unit, comprising:
a step of preparing a coil;
a step of preparing a bus bar including a substantially annular wiring portion and a connection end portion to which the coil is connected in one plane;

a step of disposing the coil and the bus bar so that a center axis direction (hereinafter referred to as "first center axis direction") of a helical structure body of the coil aligns with a center axis direction (hereinafter referred to as "second center axis direction") of the bus bar, butting an end face of one end of the coil and an end face of the connection end portion, and welding the end faces by cold pressure welding on the way to a turn of and inside the helical structure body; and a step of bending the connection end portion with respect to the wiring portion so that the first center axis direction intersects the second center axis direction.

9. The method of manufacturing a coil unit of claim 8, wherein the coil is formed to be the helical structure body by pressure-welding a strip-shaped flat conductor and a welded portion between the coil and the bus bar is formed in a linear portion of the flat conductor.

10. The method of manufacturing a coil unit of claim 9, wherein the coil is formed by:

preparing a plurality of the flat conductors wherein the plurality of flat conductors are capable of forming a helical structure body in a virtual state (hereinafter referred to as "virtual helical structure body") by butting end faces thereof, and a length of a region for one turn of the virtual helical structure body is set to be longer by a pressing amount of the pressure welding than a length of a region for one turn of the helical structure body; and pressing the end faces in respective linear portions of the plurality of flat conductors along a strip longitudinal direction, forming a connected flat conductor so that the end faces are pressure-welded and connected while a distance in the strip longitudinal direction is reduced and a length of a region for one turn of the connected flat conductor is consistent with the length of the region for one turn of the helical structure body.

11. The method of manufacturing a coil unit of claim 8, comprising a step of, after the coil and the bus bar are welded, integrally coating the coil and the busbar with a resin.

12. The method of manufacturing a coil unit of claim 11, wherein, after the coil is bent with respect to the bus bar, the coil and the bus bar are integrally coated with a resin.

13. A method of manufacturing a stator member, comprising:

a step of forming a first coil unit and a second coil unit by the method of claim 8; and a step of assembling the first coil unit and the second coil unit so that one coil of the first coil unit is different in phase of current or voltage from one coil of the second coil unit.

14. A method of manufacturing a motor, comprising a step of assembling a stator using a stator member manufactured by the method of claim 13, and assembling a rotor and the stator so that the rotor is rotatable with respect to the stator.

15. The coil unit of claim 1, wherein the coil is bendable with respect to the bus bar, and before the coil is bent, at least one region for one turn of the coil and a face of the bus bar are disposed on a substantially parallel plane so that a center axis direction of the helical structure of the coil aligns with a center axis direction of a wiring portion of the bus bar.

16. The coil unit of claim 1, wherein the wiring portion is a continuous substantially annular wiring portion.

17. The coil unit of claim 1, wherein the wiring portion connects to the connection end portion.

18. A coil unit comprising:

a coil; and a bus bar including a wiring portion and a connection end portion to which the coil is connected, wherein one end of the coil and the connection end portion are welded by cold pressure welding with end faces of them being butted in a welded portion, the end faces are a flat cross section orthogonal to a strip longitudinal direction, the welded portion is provided on the way to a turn of and inside a helical structure of the coil, and the bus bar is formed by bending wiring portion and the connection end portion that are located on substantially the same plane.

\* \* \* \* \*